US006768423B2

(12) United States Patent
Doescher et al.

(10) Patent No.: US 6,768,423 B2
(45) Date of Patent: Jul. 27, 2004

(54) CAB ENVIRONMENT WARNING AND CONTROL METHOD AND APPARATUS

(75) Inventors: Robert D. Doescher, Geneseo, IL (US); Alan G. Leupold, Planifield, IL (US); Peter H. Kennedy, Murdock, MN (US)

(73) Assignee: Case Corporation, Racine, WI (US)

( * ) Notice: Subject to any disclaimer, the term of this patent is extended or adjusted under 35 U.S.C. 154(b) by 140 days.

(21) Appl. No.: 10/080,098

(22) Filed: Feb. 21, 2002

(65) Prior Publication Data

US 2003/0156043 A1 Aug. 21, 2003

(51) Int. Cl.[7] .............................................. G08B 21/00
(52) U.S. Cl. ................ 340/626; 340/425.5; 340/573.1; 454/69; 454/70; 454/75
(58) Field of Search .............................. 340/626, 425.5, 340/573.1; 454/2, 69, 70, 75, 76

(56) References Cited

U.S. PATENT DOCUMENTS

| | | | |
|---|---|---|---|
| 3,979,657 A | * | 9/1976 | Yorksie ....................... 320/136 |
| 4,344,356 A | | 8/1982 | Casteretom et al. .......... 98/2.11 |
| 4,492,151 A | * | 1/1985 | Mattei .......................... 454/70 |
| 4,581,988 A | | 4/1986 | Mattei ........................... 98/1.5 |
| 5,333,703 A | * | 8/1994 | James et al. ................. 180/271 |
| 5,709,533 A | | 1/1998 | Dias ............................. 417/18 |
| 5,895,319 A | | 4/1999 | Matousek et al. ........... 460/100 |

* cited by examiner

*Primary Examiner*—Julie Lieu
(74) *Attorney, Agent, or Firm*—John William Stader; Collin A. Webb

(57) ABSTRACT

A method and apparatus for providing a cab pressure drop warning to an off-road machine operator and instructions for increasing the cab pressure and for providing incentive to correct the pressure drop, the method including comparing ambient and cab pressures and threshold pressure (i.e., the ambient plus a differential value), causing a vehicle operation disruption for at least a short period during which the operator may elect to remedy the cab pressure drop.

23 Claims, 6 Drawing Sheets

CAB ENVIRONMENT WARNING AND CONTROL METHOD AND APPARATUS

STATEMENT REGARDING FEDERALLY SPONSORED RESEARCH

Not applicable.

CROSS-REFERENCE TO RELATED APPLICATIONS

Not applicable.

CROSS-REFERENCE TO RELATED APPLICATIONS

Not applicable.

BACKGROUND OF THE INVENTION

While the present invention may be employed in several different off-highway applications, in order to simplify this explanation, the present invention will be described in the context of an exemplary agricultural tractor and associated cab.

Today, in farming, as in other industries, competitive pressures have forced farmers to search for ways in which to increase efficiency and productivity. One obvious way to increase efficiency and productivity is to use better and more efficient equipment such as state of the art agricultural tractors or combines. A properly configured tractor appreciably increases the speed with which farmers can plant, till, fertilize and harvest.

One other way in which to increase efficiency and productivity is to employ highly specialized equipment to perform certain farming tasks. For instance, some specialized tractors are equipped with sprayers or other chemical spreading implements that apply pesticides and other noxious products within fields extremely efficiently.

Unfortunately, state of the art tractors are relatively expensive and therefore, in order to justify the costs associated with such tractors, even though the tractors reduce the time required to perform various tasks, farmers must spread the costs of such equipment over increasingly larger enterprises. In farming, a larger enterprise typically translates, at least in part, into farming more acreage and, not surprisingly, farming more acreage typically requires a greater time commitment on the part of the farmer.

In the case of specialized equipment such as sprayer equipped tractors and the like, high costs associated with that equipment and limited uses for the equipment renders it difficult for some farmers to purchase their own such equipment. Instead, a segment of the service industry has evolved around specialized types of equipment where a single owner purchases such equipment and provides services to many farmers within an area so that, again, the cost of the equipment is spread out among many farmers and their acreage.

Because farmers and special service providers are spending greater amounts of time in their tractor cabs, cab comfort has become a relatively important feature in new tractor configuration. Thus, new tractors are typically fitted with state of the art cabs including ergonomically designed seating and controls, better lines of sight and cab space conditioning systems that control temperature, air circulation and humidity.

In addition to the features described above, the industry has also recognized that air quality within the cab space is important to operator comfort and health and also to overall system efficiency. To this end, in many applications, agricultural tractors operate in environments that include high concentrations of airborne dirt and dust. Moreover, where a tractor implement is used to spray or apply a noxious chemical, portions (e.g., droplets or particles) of the noxious chemicals often become airborne and can be inhaled by a tractor operator. Hereinafter airborne particles within an environment will collectively be referred to as "contaminants".

Inhaling contaminants can cause discomfort over short periods of time and, over long periods of time, can lead to other medical symptoms. Moreover, contaminants have been known to accumulate on heating and cooling system components and reduce both efficiency and effectiveness, thereby further reducing operator comfort.

To minimize contaminants (e.g., dirt, dust, etc.) within the cab space, it is well known to provide a completely enclosed cab and an air circulation system that takes in and filters "fresh" outside air from the ambient, heats or cools the air via an atmosphere control system and circulates the conditioned air within the cab via one or more pressurization blowers/fans. Preferably, cab air pressure is maintained above a threshold pressure that is slightly higher than atmospheric pressure (i.e., at least a few millimeters of head of water). The pressure differential between the ambient and threshold pressure inhibits entry of contaminants into the cab through, for example, imperfectly sealed doors or windows.

To increase cooling and heating efficiency, many tractor air conditioning systems will include two separate fans. In two fan systems, a first fan is typically positioned downstream of the air inlet and filter for drawing fresh air into the conditioning system from the outside ambient while a second recirculating fan is positioned downstream of a system inlet located within the cab for drawing air into the conditioning system from within the cab. The recirculating fan, as the name implies, recirculates air from within the cab through the conditioning unit. In two fan systems, the recirculated and fresh air are combined within the conditioning unit prior to being directed into the cab space. Because the recirculated air is already generally at the temperature and humidity level required inside the cab space, the system capacity required to condition the recirculated air is relatively less than the system capacity required to condition fresh air and therefore overall conditioning efficiency is increased.

Unfortunately, under certain circumstances, a cab conditioning system is rendered incapable of maintaining a cab pressure that is greater than the ambient pressure. For instance, over time, cab door and window seals deteriorate and air escapes there through at an unexpectedly high rate thereby reducing cab pressure appreciably. As another instance, "fresh" air filters (i.e., filters that clean air drawn in from the outside ambient) often become clogged thereby starving the fans of inlet air and reducing cab space air pressure. As yet another example, inadvertent placement of any item in front of a blower outlet port can cause a reduction in cab pressure. Other potential causes of cab pressure drop include malfunctioning fans, improperly positioned air louvers, slightly open doors or windows, an item (e.g., a seat belt) stuck within a closed door, etc.

One solution for maintaining a desired cab pressure in spite of some of the causes of pressure drop described above has been to facilitate either manual or automatic fan speed adjustment. To this end, pressure sensors have been developed that compare ambient and cab pressures and generate alarm signals indicating when the cab pressure dips below a threshold pressure that is slightly above the ambient pressure. In the case of manually adjustable systems, the alarm signals are fed to indicators (i.e., a small light) within the cab and, when an indicator is activated, the operator is warned of the pressure problem. An operator's manual may advise to adjust the fan speed or to modify the positions of louvers within the system plenum and duct sub-system to increase air flow.

In the case of automatically adjustable systems, the alarm signals are fed to a controller that adjusts fan speed either up or down or louver positions to maintain the cab pressure above the threshold pressure thereby maintaining cab space-ambient pressure differential yet minimizing required fresh air filtering. One exemplary automatic fan speed adjustment system is described in U.S. Pat. No. 4,581,988 (hereinafter "the '988 patent") which issued on Apr. 15, 1986 and which is entitled "Protective Device for Work in Polluted Environment". The '988 patent also teaches that, after increasing fan speed, if cab pressure remains below the threshold pressure, the controller activates an indicator (e.g., a small light) to warn the operator that the automatic corrective action has failed to maintain the cab space-ambient pressure differential.

In either of the manual or automatic blower speed adjustment cases, if an alarm condition occurs despite maximum fan speed, the tractor operator is supposed to recognize that the intake filter is clogged and take steps to unclog the filter. Filter unclogging may include removing a filter element and either replacing the element or cleaning the element and placing the cleaned element back into the system. Unfortunately, while advantageous, the automatic and manual pressure maintaining systems described above have several shortcomings.

First, the systems described above rely on tractor operators to take steps to correct cab pressure problems after the problems have been indicated. While operator initiative would not be a problem in some industries, as indicated above, farmers and specialized service providers often work under seemingly unreasonable time constraints and, for that reason, may elect to forego performing tasks that the farmer "perceives" as unnecessary. This willingness to forego seemingly unnecessary tasks is particularly true during intense periods such as planting season, harvesting season, fertilizing times, etc., where particular tasks have to be completed within relatively short periods. Under these circumstances, an activated cab pressure light may be completely ignored as relatively unimportant (i.e., operator comfort is sacrificed for greater efficiency).

Second, even where an operator may elect to perform simple remedial tasks to increase cab pressure, the operator may be unaware that the pressure problem can be corrected via such simple tasks and therefore may forego performing the tasks. For instance, an operator may assume the cab pressure problem is due to a clogged filter that needs to be replaced which would require a trip out of the field to a maintenance location while the real problem is an improperly latched cab door. Clearly the burden of the perceived remedy affects whether or not an operator may elect to perform the remedy.

Third, even where a tractor operator responds to an activated cab pressure light, the operator may take steps to unclog the fresh air filter and, if those steps fail to deactivate the light, may assume that the light is on in error. This is especially true in systems where the threshold pressure (i.e., cab pressure) is only slightly above the outside ambient pressure as the differential, even when properly maintained, would be difficult for an operator to independently confirm.

Fourth, even where a tractor operator would think to go beyond unclogging the filter and attempt to identify some other cause of cab depressurization, the operator may not recognize every likely depressurization source, the most likely sources, the easiest sources to eliminate, etc. To this end, to avoid frustration, the operator should ideally first check the most likely sources and the easiest sources of depressurization to alleviate. Thus, checking an unlikely source of depressurization would often be a waste of time. Similarly, given two potential sources where one is difficult to alleviate and the other is relatively easy to alleviate, it makes sense to check the one that is easy to alleviate prior to the one that is difficult to alleviate as the overall time required to repressurize the cab will, on average, be less.

One solution that could aid an operator in identifying potential depressurization causes would be a trouble shooting manual that lists sources arranged as a function of likelihood and/or ease of use. Unfortunately, as in the case of most vehicle manuals, farmers often do not store manuals in cabs and therefore the manuals are not readily available when most needed (i.e., typically in a field). In addition, even if a farmer had a trouble shooting manual handy when needed, again, because of time constraints, the farmer may opt not to respond to an activated pressure indicator.

For the reasons discussed above it would be advantageous to have a system that effectively incentivizes and helps a tractor operator to take corrective action when cab space-pressure falls below a threshold pressure that is slightly above the outside ambient pressure.

SUMMARY OF THE INVENTION

It has been recognized that even a simple annoyance or disturbance during tractor operation can tip the balance in favor of taking remedial steps to correct for cab depressurization. This is particularly true in cases where the disturbance renders a tractor essentially useless for a specific purpose for even a short amount of time. For instance, disabling an implement for five minutes or until cab pressure is increased presents a tractor operator with the choice of either wasting five minutes or attempting to correct the pressure problem to reduce the duration of the disablement. Faced with such a choice, more often than not an operator will choose to at least attempt to remedy the problem. According to the present invention, balance tipping disturbances may take any of several different forms including, in addition to disabling an implement, generating an annoying alarm (e.g., audible buzz, blinking light, etc.), reducing maximum vehicle speed, etc. It has also been recognized that often, despite the existence of a relatively simple remedial step to correct a cab pressure problem, a tractor operator will ignore a pressure problem. The operator may ignore the problem because the operator assumes that some relatively time consuming remedial process would be required to eliminate the problem and fails to recognize the simple remedial step. In these cases it has been recognized that simply providing a list of possible pressure reducing sources that are easy to remedy can cause a "disturbance" in the broadest sense as, faced with simple and minimal time consuming remedies, an operator will be compelled to attempt to remedy the pressure problem.

Consistent with the above comments, an exemplary embodiment of the invention includes an apparatus for protecting a vehicle operator within a cab of a mobile vehicle working in a polluted environment, the cab sealed from the polluted environment and including a pressure system for maintaining a cab pressure above a threshold pressure and a pressure sensor for generating an alarm signal when the cab pressure drops below the threshold pressure. The apparatus comprises a timer and a processor linked to the timer and for, when a first alarm signal is generated, disrupting operation of the vehicle, timing out a disrupt period and, at the end of the disrupt period, returning the vehicle to normal operation. In one embodiment, during the disrupt period, the processor monitors the alarm signal and, if the alarm signal ceases, returns the vehicle to normal operation.

In one aspect certain embodiments further including a communication device for communicating information to a vehicle operator and a memory device for storing information related to possible causes of cab pressure reduction. In these cases, the processor is linked to the communication device and the memory device and, when an alarm signal is generated, the processor retrieves the information and provides the information to the vehicle operator via the communication device. In some cases the information also includes a message that vehicle operation will remain disrupted for the duration of one disrupt period unless the cab pressure rises above the threshold pressure. In some cases the information includes a list of instructions guiding the vehicle operator to perform various tasks to increase the cab pressure to a point above the threshold pressure.

Where the vehicle includes an implement the processor may disrupt by disabling the implement and, in these cases, the processor may cause a marker or a vehicle location system (e.g., GPS) to mark location upon disabling the implement. In other cases the system may include an audible alarm and the processor may disrupt by activating the alarm. In still other cases the processor may disrupt by reducing the maximum vehicle speed.

The apparatus may further include an indicator and, in some cases, when the first alarm signal is generated, the processor may be programmed to activate the indicator and time out a delay period prior to disrupting vehicle operation.

The invention further includes an apparatus for protecting a vehicle operator within a cab of a mobile vehicle working in a polluted environment, the cab sealed from the polluted environment and including a pressure system for maintaining a cab pressure above a threshold pressure and a pressure sensor for generating an alarm signal when the cab pressure drops below the threshold pressure. Here the apparatus comprises a communication device for communicating information to the vehicle operator, a memory device for storing information related to possible causes of cab pressure reduction and a processor linked to the communication device and the memory device and for, when an alarm signal is generated, retrieving the instructions and providing the instructions to the vehicle operator via the communication device. Again, here, the information may include a list of instructions guiding the cab operator to perform various tasks to increase the cab pressure to a point above the threshold pressure.

In addition to the apparatus described above, the invention also includes methods that perform the processes that are performed above. The methods are described in greater detail in the specification that follows.

Thus, it should be appreciated that the present invention, upon cab depressurization, provides a hindrance that is calculated to tip the balance in favor of a tractor operator at least attempting to correct the pressure problem. Where the operator either decides not to correct the problem or attempts to correct the problem and the cab pressure does not increase to a desired level, the system automatically returns tractor operation to normal after a disrupt period so that operations can continue. In some embodiments the operator is, in effect, warned that operation will be disrupted at the end of a delay period so that the operator has the ability to effectively select where within a task being performed, the operator should halt vehicle operations to attempt to remedy the pressure problem.

These and other aspects of the invention will become apparent from the following description. In the description, reference is made to the accompanying drawings which form a part hereof, and in which there is shown a preferred embodiment of the invention. Such embodiment does not necessarily represent the full scope of the invention and reference is made therefore, to the claims herein for interpreting the scope of the invention.

DESCRIPTION OF THE PREFERRED EMBODIMENTS

Figure 1:
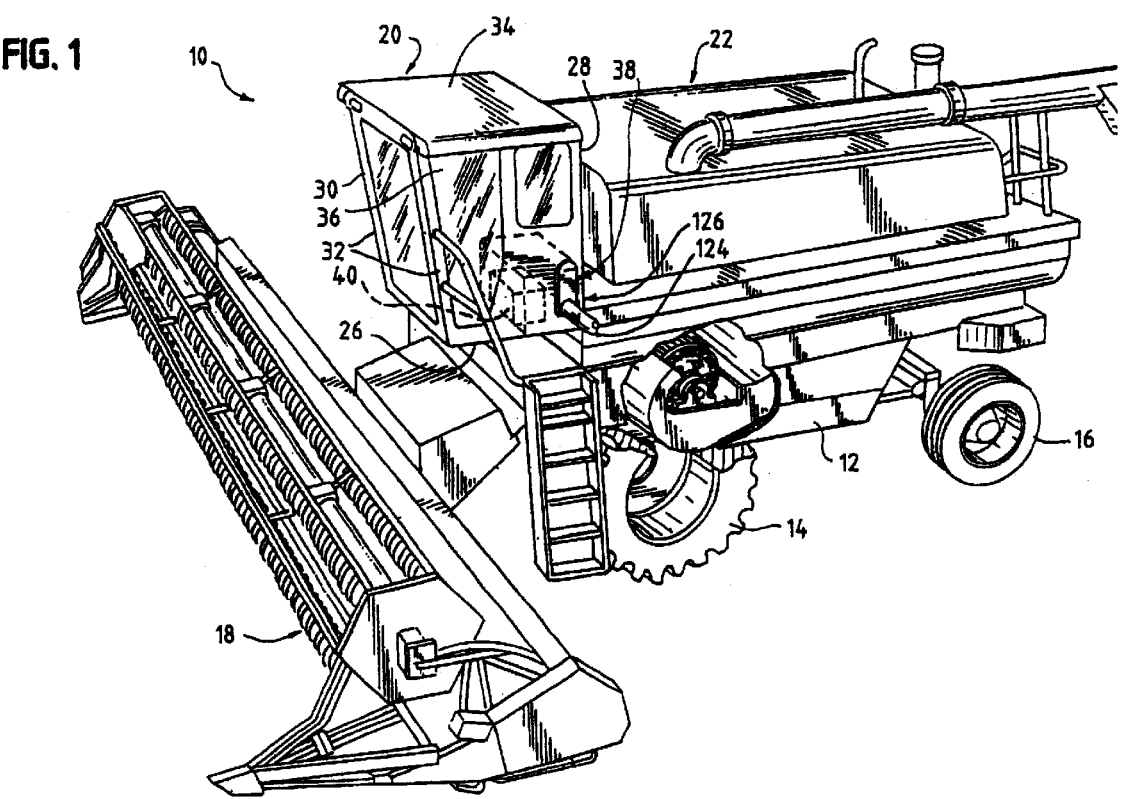
FIG. 1 illustrates a perspective view, partially broken away, of an off-highway machine such as an agricultural harvester.

The figures and corresponding text below describe several exemplary embodiments of the invention. However, it should be understood that the present disclosure is only exemplary of the invention and is not intended to be limiting and that the claims below should be referred to for a full understanding of the scope of the invention.

Referring now to the drawings wherein like reference numerals refer to like parts throughout the several views and, more specifically, referring to FIG. 1, the present invention will be described in the context of the exemplary self-propelled off-highway machine or agricultural tractor 10 illustrated. Suffice it to say, as tractor 10 is driven through a field, and particularly as a result of operating the implements attached to tractor 10, ambient air in and about tractor 10 becomes laden with debris in the form of dirt, dust, chaff and a myriad of other contaminants.

As is well known in the art, tractor 10 includes a mobile frame 12 which, in the illustrated embodiment, is mounted on a pair of front drive wheels 14 and a pair of rear steerable wheels 16. Toward a front end of tractor 10, a laterally elongated header assembly 18 is mounted to frame 12 for reaping and gathering crop materials as tractor 10 is driven across a field. As will be appreciated by those skilled in the art, during the harvesting operation, header assembly 18 adds a significant amount of dust and other contaminants to the ambient air surrounding tractor 10. To offer protection against such contaminants, an enclosed operator cab is mounted toward a front end of frame 12 above header assembly 18. A main body or walled enclosure 22 is also mounted on frame 12 reward of cab 20. An internal combustion engine (not shown) is mounted within walled enclosure 22.

While the illustrated tractor 10 includes header assembly 18 for reaping crop, it should be appreciated that other tractors employing other farming implements (e.g., sprayers, tillers, etc.) that contribute to ambient contamination are contemplated. In the interest of simplifying this explanation, assembly 18 and other proposed implements that may cause airborne contaminants will be referred to generally hereafter as "implements".

Cab 20 is generally rectangular in shape and preferably includes a floor 26, a rear wall 28, a front window or wall 30, opposite side walls 32, and a roof 34. An access door 36 is formed in one of the side walls 32. As is well known, within the space defined by cab 20, components are mounted including an operator's seat (not illustrated), a steering column (also not illustrated) and various other components and equipment for controlling operation of tractor 10.

Referring still to FIG. 1, an air conditioning system 38 includes an inlet duct 124, a filter assembly 126 and a control assembly 40. Assembly 40 is illustrated as being within cab 20 and disposed under an operator's seat. Duct 124 has a first end that forms an opening positioned in the ambient outside the space defined by cab 20 and a second end that opens into filter 126. Filter 126 is mounted to an exterior side wall 32 of cab 20 thereby facilitating ready access to a replaceable and perhaps cleanable filter element (not separately illustrated (i.e., chemical filter elements often are not cleanable)) disposed therein.

Figure 2:
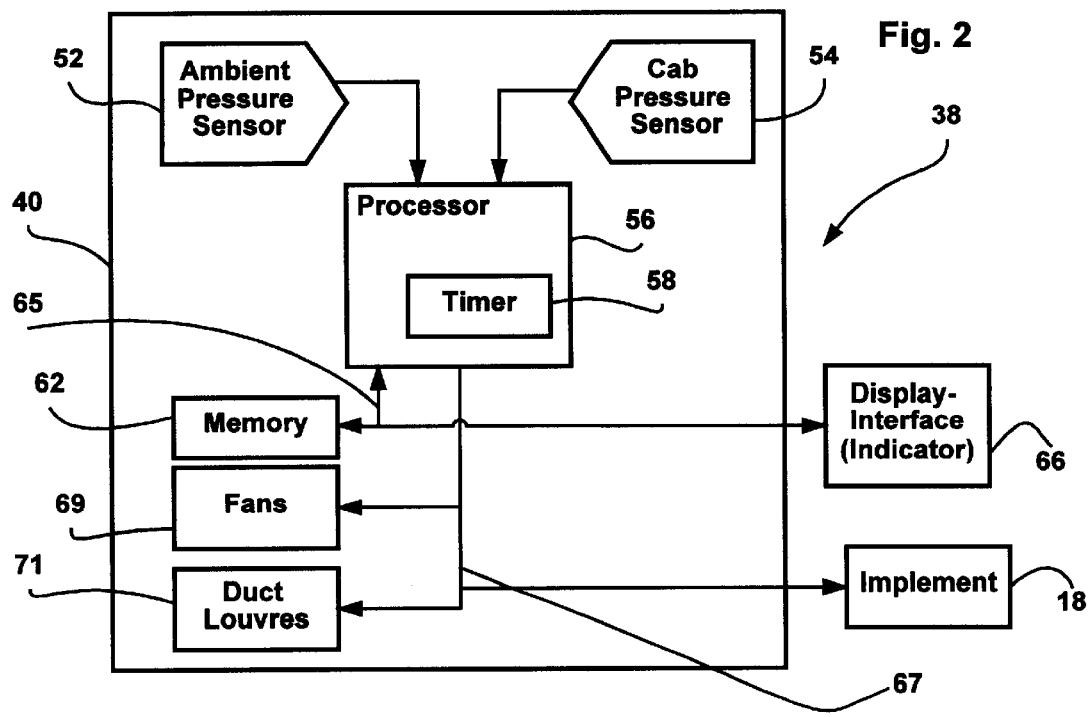
FIG. 2 is a schematic diagram of the controller illustrated in FIG. 1.

Referring to FIGS. 1 and 2, control assembly 40 includes a number of components including an ambient pressure sensor 52, a cab pressure sensor 54, a processor 56 that includes a timer 58, a memory 62, one or a plurality of fans 69 and one or a plurality of duct louvers 71. Both of the ambient pressure sensor 52 and cab pressure sensor 54 are linked to processor 56 and provide pressure sensor signals thereto. In addition, a two way data bus 65 links processor 56 to memory 62 and display/interface 66 and a one way control bus 67 links processor 56 to each of fans 69, louvers 71 and implement 18 for control thereof.

A program that can be run by a processor 56 to perform one of several similar yet distinct control algorithms that are consistent with the teachings of the present invention is stored in memory 62 and can be accessed via bus 65. In addition, in the case of algorithms where fan speed and louver positions are automatically controlled, processor 56 adjusts speed and position, respectively, via control signals on bus 67. Similarly, in the case of algorithms where implement operation is disabled and enabled, processor 56 disables and enables via control signals on bus 67.

Although not illustrated in FIG. 1, in at least one exemplary embodiment of the invention, display/indicator 66 includes a CRT or other similar type of video monitor which can provide text messages to a tractor operator. In addition, display/interface 66 may also include some type of data entry device (e.g., a key or keyboard, touch screen, etc.) facilitating operator control or input in certain embodiments. Display 66 is mounted within cab 20 within an easily observable and accessible line of sight of a system operator located inside the cab space.

Depending upon the layout of the conditioning system 38, fans 69 may include one, two or more fans. For instance, in some configurations, a single fan may be disposed to draw air from both the cab space (i.e., recirculated air) and fresh air from the ambient. In this case a louver 71 is likely positioned within the intake duct system to adjust the ratio of recirculated and fresh air drawn by the fan. In other configurations separate fans may be provided for fresh and recirculated air intake and perhaps more than one fan may be provided in other embodiments for either of recirculated or fresh air intake. In multi-fan configurations additional control may be provided via adjustable duct louvers. In addition, in any of the fan-louver configurations, fan speed may or may not be adjustable. Moreover, the invention is useful with configurations that either facilitate manual fan speed and louver position control or automatic control.

Referring to FIGS. 1 and 2, although not illustrated, an intermediate duct similar to duct 124 is positioned between filter 126 and one or more of fans 69 so that, as fans draw fresh air in through duct 124 and the intermediate ducts, the fresh air is drawn through filter 126 prior to discharged into the cab 20 space. To simplify this explanation, it will be assumed that a recirculated air duct (not illustrated) is provided within cab 20 so that an inlet end draws air from the space defined by cab 20 and an outlet end is connected within the suction path of at least one fan 69.

Figure 4:
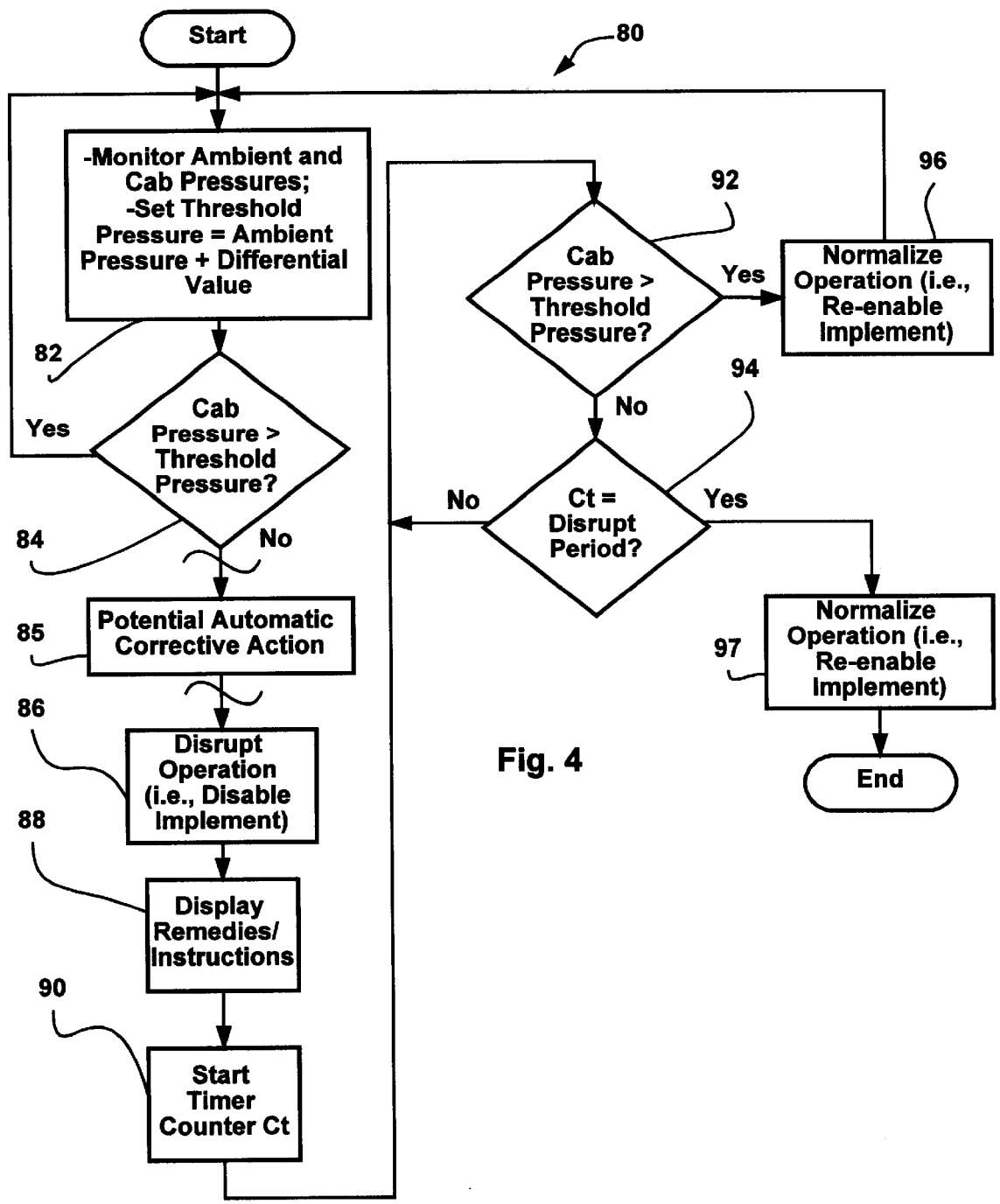
FIG. 4 is a flow chart illustrating one exemplary method according to the present invention.

Referring now to FIG. 4, an exemplary method 80*a* according to the present invention is illustrated. Referring also to FIGS. 1 and 2, during operation of tractor 10 within a field and while implement 18 is being operated to reap and collect crops, the ambient pressure sensor 52 and the cab pressure sensor 54, either continuously or at distinct intervals, sense the ambient and cab pressures, respectively, and provide pressure signals to processor 56. Thus, at process block 82, processor 56 monitors the ambient and cab pressures. In addition, at block 82, processor 56 sets a threshold pressure equal to the ambient pressure plus a differential value. The differential value is equal to a few (e.g., 2–5) millimeters of head of water so that the threshold pressure is slightly above the ambient pressure.

Continuing, at block 84, processor 56 compares the cab pressure to the threshold pressure. Where the cab pressure exceeds the threshold pressure, control passes back up to block 82 and processor 56 continues to monitor both the ambient and cab pressures and, in the event that the ambient pressure changes, adjusts the threshold pressure essentially in real time. Thus, the method 80*a* continues to loop through blocks 82 and 84 in a circular fashion as long as the cab pressure exceeds the threshold pressure.

Referring still to block 84, if the cab pressure drops below the threshold pressure, control passes to block 86 (block 85 is described below). At block 86, microprocessor 56 disrupts operation of tractor 10 in some fashion. For instance, in some embodiments disruption may include disabling a primary implement (e.g. 18). Other disruption steps may include slowing tractor maximum speed, activating an audible alarm, blinking a light, etc. To simplify this explanation, hereinafter vehicle disruption shall be assumed to include implement disablement. In the example of the reaper/collector illustrated in FIG. 1, disabling the implement means turning off the motors and other control mechanisms that operate implement 18 so that reaping and collecting are no longer facilitated. Continuing, at block 88, processor 56 retrieves message segments stored in memory 62 and provides the message segments as a screen shot on display 66 for the operator located in cab 20 space to view.

Figure 3:
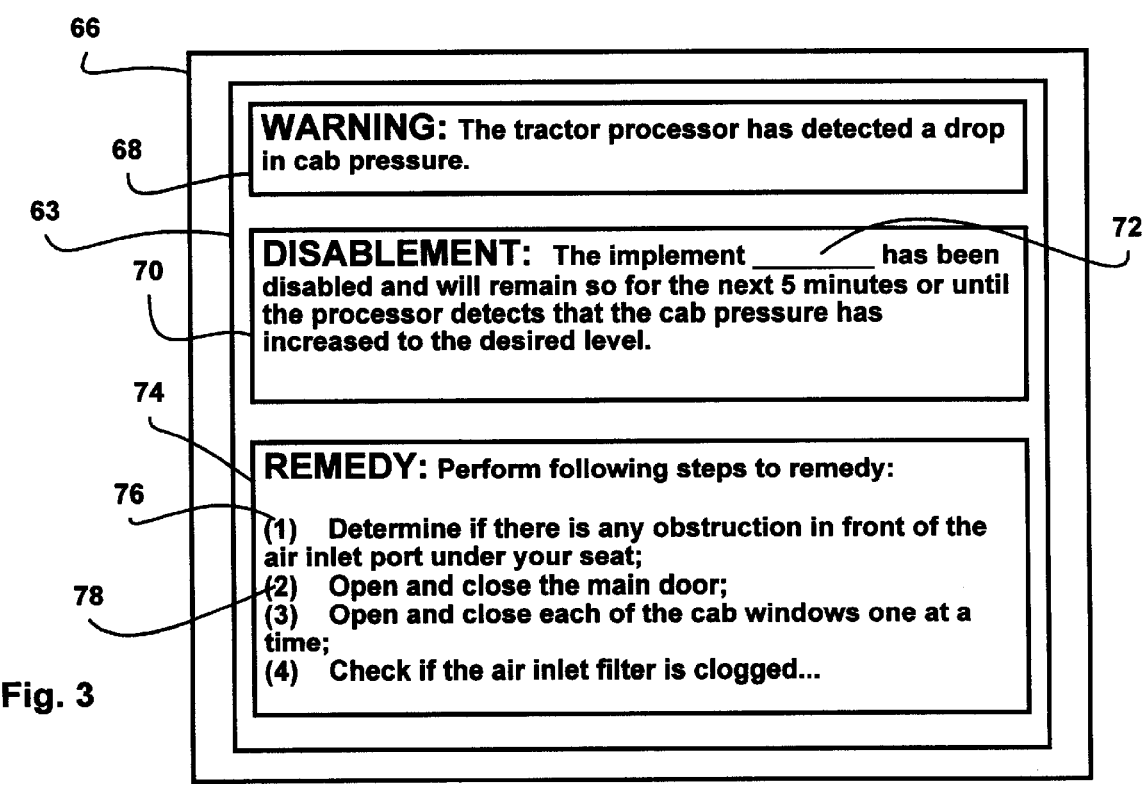
FIG. 3 is an exemplary screen shot that may be provided for a tractor operator to view via the display of FIG. 2.

Referring also to FIG. 3, an exemplary screen shot 63 that may be provided via display 66 is illustrated. The exemplary shot 63 comprises three separate message segments including a warning segment 68, a disablement segment 70 and a remedy segment 74. Warning segment 68 indicates a tractor operating condition that has been sensed and that should be corrected prior to continued tractor operation. To this end, consistent with the present invention, warning segment 68 indicates that "The tractor processor has detected a drop in cab pressure".

Disablement segment 70 notifies the tractor operator of a modification to tractor operation which has been facilitated because of the condition indicated via warning segment 68. The exemplary disablement segment message indicates that "The implement_____ has been disabled and will remain so for the next five minutes or until the processor detects that the cab pressure has increased to the desired level". In the case of the reaper implement 18 illustrated in FIG. 1, the blank space 72 in the disablement segment 70 would be filled in with a phrase akin to "reaper/collector" indicating that operation of the tractor 10 to reap and collect crops has been and will remain disabled for the next five minutes. (i.e., disable period).

Referring still to FIG. 3, the remedy segment of the screen shot provides a number of steps that can be performed by the tractor operator in order to try to remedy the drop in cab pressure. For example, as illustrated, remedy segment 74 instructs the tractor operator to first "Determine if fresh air inlet louvers are obstructed". It is contemplated that if a fresh air inlet is obstructed and the obstruction caused the drop in the cab air pressure, when the obstruction is eliminated by the operator, the cab pressure will increase relatively quickly and the first step in the remedy process will have alleviated the pressure problem. If, however, elimination of the obstruction does not increase cab pressure or there was no obstruction of the fresh air inlet port, the second step in the remedy segment 74 instructs the operator to "Open and close the main door" 78. Other process steps are illustrated as part of remedy segment 74 in FIG. 3 and many other steps are contemplated.

Thus, the exemplary screen shot 63 indicates a cab pressure drop, confirms that the implement has been disabled and will remain disabled for a disable period of five minutes unless the cab pressure increases to the desired level before the end of the five minute disable period and provides a list of likely and easy to perform remedies for the operator to perform in an effort to correct the cab pressure problem and shorten the delay period.

When faced with the warning, confirmation of disablement and potential remedies, recognizing that corrective action may reenable the implement, the operator will be incentivized to perform the remedy steps in the order indicated. In most cases, the operator will be able to quickly correct the pressure problem and continue using the implement as desired.

Referring still to FIGS. 1 through 4, after the remedies and instructions have been provided at block 88 control passes to block 90 and processor 56 starts timer 58 thereby generating a time out count $C_t$. Control then passes to block 92 where processor 56 continues to compare the cab pressure from cab pressure sensor 54 to the threshold pressure. Where the operator performs some remedial step that corrects the cab pressure problem, at block 92 the cab pressure will exceed the threshold pressure again and control will pass to block 96 where the implement 18 is reenabled. Thereafter, control passes from block 96 back to block 82 where processor 56 again continues to monitor the ambient and cab pressures from sensors 52 and 54, respectively and revises the threshold pressure to be equal to the ambient pressure plus the differential.

Referring again to block 92, where a tractor operator's efforts to increase cab pressure fail, control passes to block 94 where a time out count Ct value is compared to the disable period (i.e., in the present example five minutes). Where the time out count Ct is not equal to the time-out period, control passes back up to block 92 where processor 56 continues to compare the cab and threshold pressures. Eventually, after the five minute disable period, when the time out count Ct is equal to the disable period, control passes from block 94 to a second reenable implement block 97 where implement 18 is reenabled. After block 97 the process 80*a* ceases as opposed to returning to block 82 for additional ambient and cab pressure monitoring.

Thus, it should be appreciated that, upon depressurization of cab 20, implement operation is halted and the operator is faced with a choice. On one hand, the operator can simply wait out the disable period and then carry on with use of the implement. This choice, however, is not a very good choice as the operator will, in effect, be wasting the duration of the disable period. In addition, this choice clearly will not correct the cab pressure problem and therefore, may have additional consequences for the operator.

On the other hand, the operator may choose to perform the remedial steps to correct the pressure problem. Here, the operator's actions may avoid personal consequences for the operator and, in addition, may reduced the duration of implement disablement.

In addition, it should be appreciated that the system described above is relatively simple and inexpensive to implement yet facilitates remedial steps calculated to correct a depressurization problem. To this end, instead of providing automated sensors and the like to identify the source of depressurization and automated means to eliminate the source once identified (an expensive and essentially impossible proposition), the inventive system relies on sensing only the end result (i.e., pressure differential) to determine if remedial steps have eliminated the source.

Figure 5:
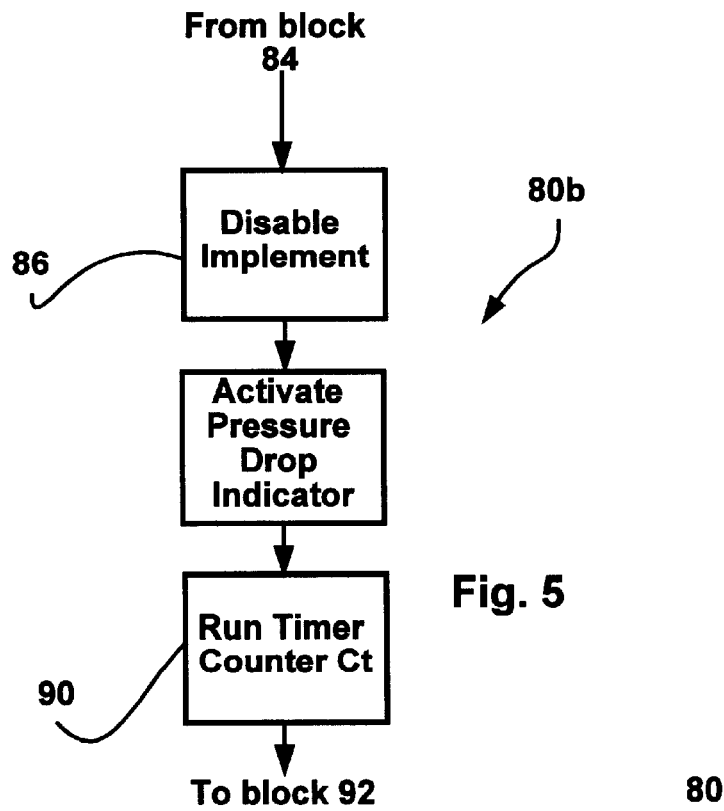
FIG. 5 is a portion of a flow chart consistent with a second exemplary method of the invention.

Referring now to FIG. 5, a portion of a second exemplary method 80*b* according to the present invention is illustrated. The method 80*b* illustrated in FIG. 5 is similar to the method illustrated in FIG. 4 and therefore the Yeoman's share of the blocks of FIG. 4 have been omitted in FIG. 5 and blocks in FIG. 5 that have numbers identical to those in FIG. 4 represent essentially identical steps in the control algorithm. The primary difference between the methods of FIGS. 4 and 5, is that, while in FIG. 4, processor 56 provides remedies and instructions at block 88, in FIG. 5, after the implement 18 has been disabled at block 86, control passes to a block 87 where a simple pressure drop indicator is activated prior to control passing to block 90 where processor 56 activates timer 58. In this case, the pressure drop indicator may simply be an audible alarm generated via a speaker or some other type of sound synthesizer or may be a small light (e.g., LED) within the line of sight of the tractor 10 operator.

Printed indicia on a dash board adjacent the pressure drop indicator may provide a message akin to "cab pressure drop" so that, upon activation, the operator recognizes that a cab pressure problem exists. In this case, the operator would have to know that when the implement 18 is automatically disabled, the implement would remain disabled for a short period while the operator performs some steps to increase the cab pressure. To help guide the operator to perform suitable corrective steps, the indicia adjacent the indicator may also reference an operator's manual. However, referencing a manual is not preferred as, as indicated above, operators may not store manuals within cabs for in field reference.

As in the case of the method of FIG. 4, if the operator's efforts increase cab pressure above the threshold pressure level within the disable period or if the disable period lapses, implement 18 would be reenabled for use.

Figure 6:
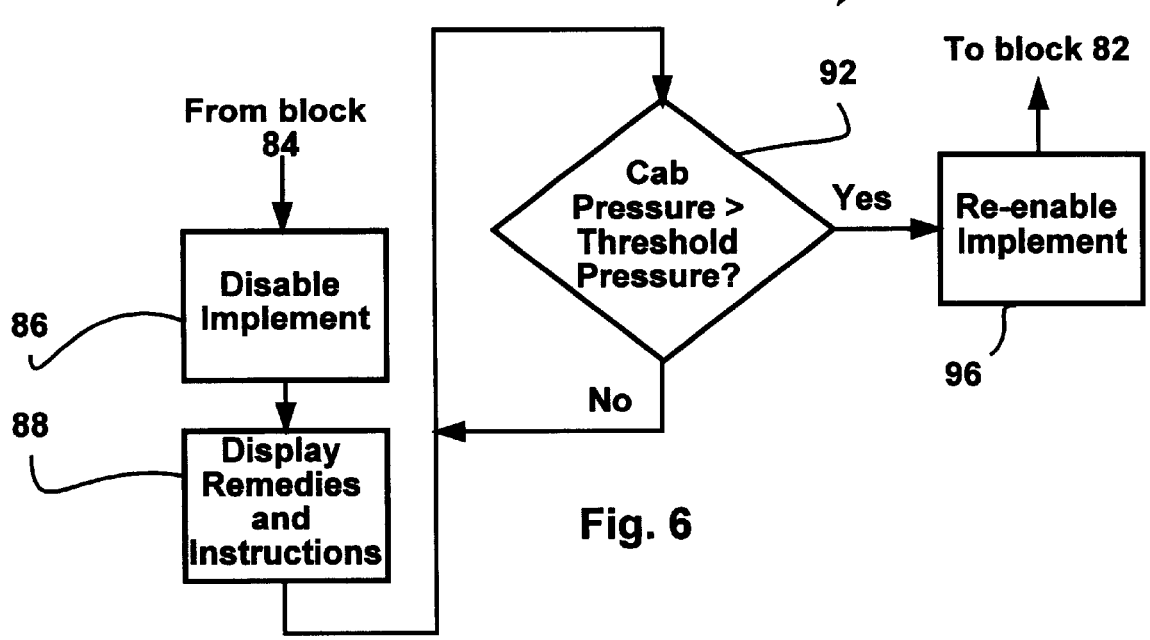
FIG. 6 is a portion of a flow chart illustrating a third exemplary inventive method.

Referring now to FIG. 6, a portion of a third method 80c according to the present invention is illustrated. Referring also to FIG. 4, much of the method 80c of FIG. 6 is similar or identical to the method 80a of FIG. 4 and therefore is not repeated in FIG. 6. In addition, all of the method steps illustrated in FIG. 6 have identical or similar steps in FIG. 4 and therefore the same numbers are used in FIG. 6 to indicate the similar steps.

The FIG. 6 method 80c is different than the FIG. 4 method 80a in that, generally, processor 56 does not initialize a timer 58 and does not reenable implement operation after a disable period. To this end, referring to FIGS. 1 through 3 and also FIG. 6, after the cab pressure dips below the threshold pressure and implement 18 is disabled at block 86, the warning segment 68 and the remedies segment 74 are displayed via display 66 but the disablement segment 70 is omitted. Thereafter, instead of activating timer 58, processor 56 control passes to block 92 where the cab pressure is again compared to the threshold pressure. Where the cab pressure remains less than the threshold pressure, control of processor 56 continues to loop through block 92 in a continuous loop and, until the cab pressure is reestablished at a level above the threshold pressure, implement 18 remains disabled. Referring still to block 92, if operator activity is able to increase cab pressure, control passes to block 96 where implement 18 is again enabled and control passes to block 82 (see again FIG. 4).

Figure 7:
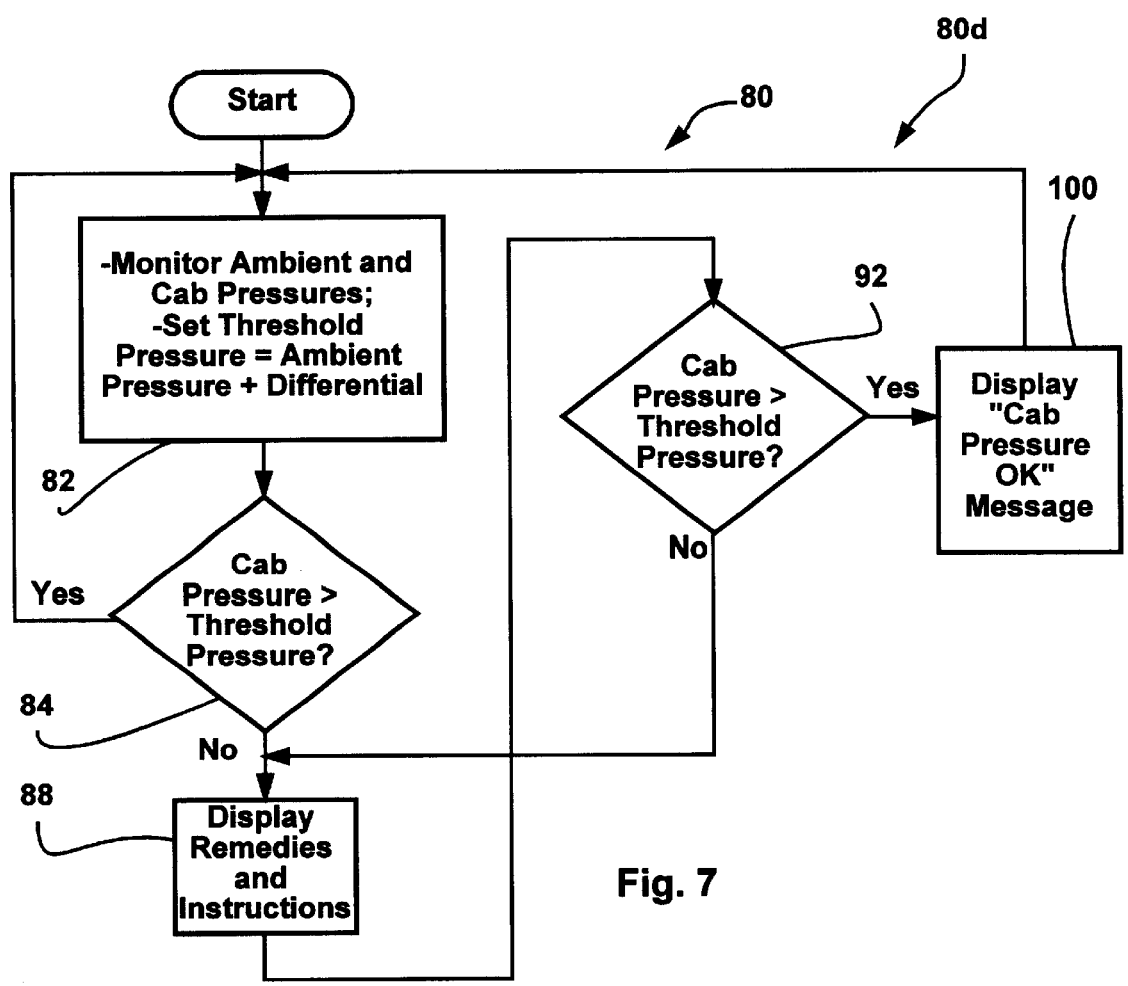
FIG. 7 is a flow chart illustrating a fourth exemplary method according to the present invention.

Referring now to FIG. 7, a fourth method 80d consistent with the present invention is illustrated. Once again, method 80d is similar to the method 80a illustrated in FIG. 4 including various process blocks that are essentially identical and therefore, similar or identical process blocks in method 80d are ear-marked with the numbers used to identify similar blocks in method 80a of FIG. 4. The main difference between method 80d and method 80a is that, method 80d does not disable an implement when cab pressure drops below the threshold pressure. Thus, method 80d begins at block 82 where processor 56 again monitors ambient and cab pressures and sets the threshold pressure equal to the ambient pressure plus the differential value. Continuing at block 84, processor 56 compare the cab pressure to the threshold pressure and, again, when the cab pressure is greater than threshold pressure, control loops back up to block 82. Where cab pressure is less than the threshold pressure at block 84, a control passes to block 88 where processor 56 displays only the warning segment 68 and the remedy segment 74 via display 66. After the remedies and warning have been displayed, control passes to decision block 92 where, again, processor 56 compares the cab and threshold pressures. Where the cab pressure remains below the threshold pressure, control passes again to block 88 where the remedies and instructions remain on the display 66. Where, however, the cab pressure rises above the threshold pressure, control passes to block 100 where the message "Cab pressure Ok" is provided via display 66 prior to control passing back to block 82.

Thus, in this embodiment of the invention, a warning and easy to perform remedies are provided when cab pressure drops but the implement remains functional. While not providing as much incentive to correct the pressure problem as disabling algorithms, by quickly and automatically providing simple remedial solutions, the burden of correcting the pressure problem is minimized and, in that regard, the balance of consideration (i.e., personal consequences vs. time to correct) as a whole will likely tip in favor of correcting instead of avoiding the problem.

Referring again to FIG. 4, method 80a has been described as a method wherein processor 56 does not automatically operate to attempt to increase cab pressure when the cab pressure drops below the threshold pressure. However, it should be appreciated that processor 56 could easily take at least some steps to increase cab pressure prior to disabling the implement 18 and prior to providing remedies and instructions to the tractor operator. To this end, referring also to FIG. 2, processor 56, upon determining that the cab pressure drops below the threshold pressure at block 84, may delay disablement of the implement 18 at block 86 while processor 56 either increases speed of one or more fans 69 within the conditioning system or adjusts positions or relative positions of duct louvers 71. This automated corrective step is represented by block 85 which, in addition to attempting a remedy, would also include a monitoring step to determine if the remedy was successful. After one or more automated attempts to increase cab pressure via fan speed and louver position modifications, processor 56 control may then disable the implement at block 86 and continue as illustrated in FIG. 4.

Figure 8:
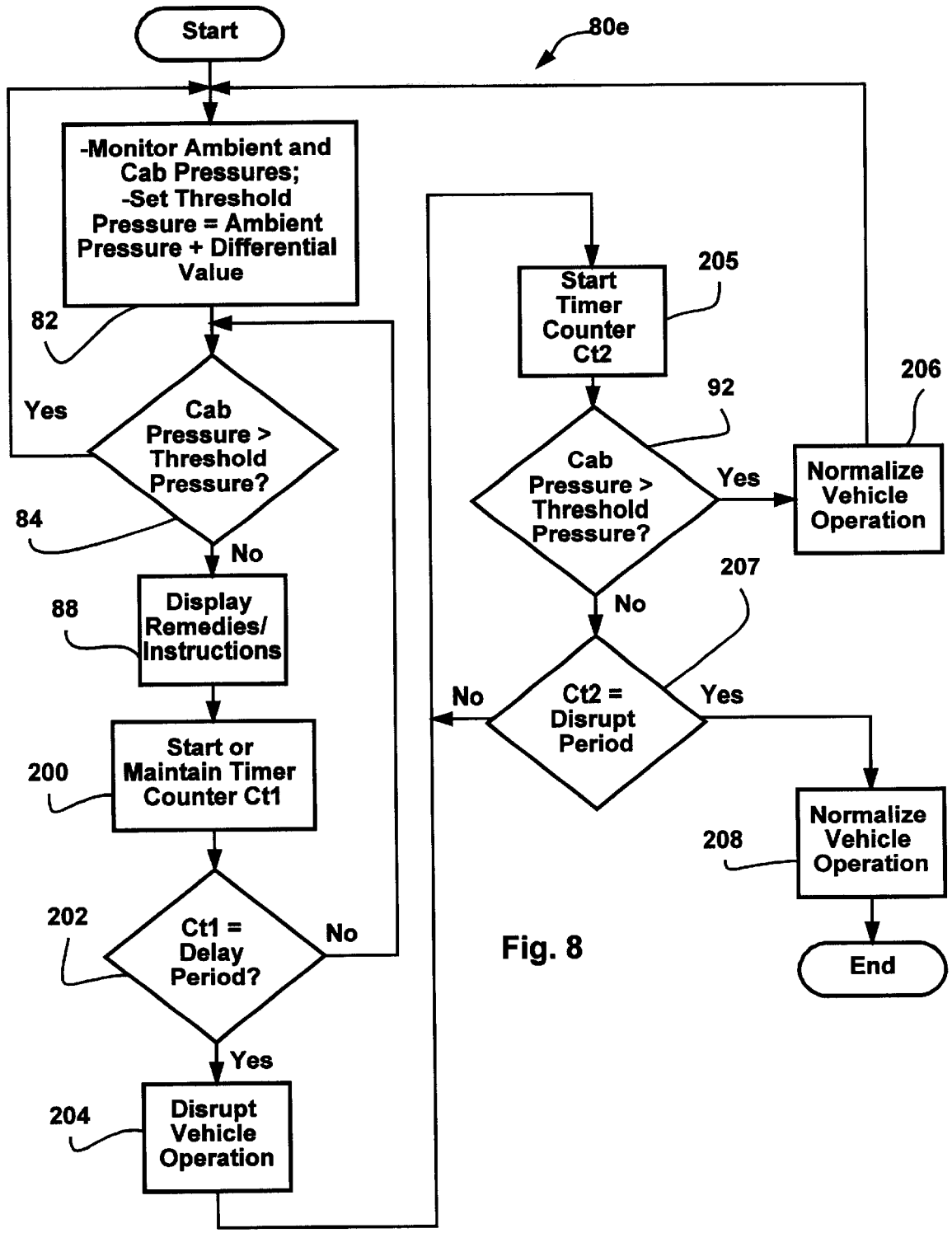
FIG. 8 is a schematic diagram of yet one other method according to the present invention.

Referring now to FIG. 8, yet one other method according to the present invention is illustrated. Once again, method 80e is similar to the method described above with respective to FIG. 4 and, for that reason, many of the blocks illustrated in block 8 are identified using numbers that are identical to the numbers illustrated in FIG. 4, identically enumerated blocks corresponding to similar method steps. There is one main distinction between method 80e and the method of FIG. 4. To this end, according to method 80e, prior to disrupting vehicle operation due to cab depressurization, method 80e displays remedies and instructions for the tractor operator during a delay period. In this case, the delay period may be several minutes (e.g., 5–10 minutes). The delay period is meant to allow the tractor operator to select an optimal time during which to disrupt vehicle operation and attempt to correct the cab pressure problem. For example, an operator may wish to travel to the end of a row within a field prior to attempting to correct for cab depressurization. After the delay period, if cab pressure has not risen above the threshold pressure, vehicle operation is disrupted and remains disrupted for the duration of a single disrupt period in a fashion similar to that described above with respect to FIG. 4.

Referring to FIGS. 1 through 3 and FIG. 8, method 80e begins at process block 82 where processor 56 again monitors ambient and cab pressures from sensors 52 and 54 and sets the threshold pressure. At block 84, processor 56 compares the cab and threshold pressure and, where the cab pressure drops below the threshold pressure, control passes to block 88 where the remedies and instructions are displayed via display interface 66. At block 200, processor 56 starts a first timer counter $C_{t1}$ to count out or time out the delay period. At block 202, processor 56 compares the first count value $C_{t1}$ to the delay period and, where count $C_{t1}$ is less than the delay period control pass back up to block 84 and cycles through blocks 84, 88, 200 and back to block 202. If, during the delay period, the cab pressure again rises above the threshold pressure at block 84, control passes from block 84 back to block 82 and the cycle of blocks 82 and 84 begins anew.

If the cab pressure remains below the threshold pressure during the entire delay period, control eventually passes from block 202 to block 204 where vehicle operation is disrupted. At block 205, processor 56 starts a second timer counter $C_{t2}$. At block 92, processor 56 again compare the cab pressure to threshold pressure and were cab pressure rises above the threshold pressure control passes to block 206 were vehicle operation is normalized. However, at block 92, where cab pressure remains below the threshold pressure, control passes to block 207 where processor 56 compares the timer counter value $C_{t2}$ to the disrupt period. Where value $C_{t2}$ is less than the disrupt period, control passes again to block 205. Eventually, if the cab pressure remains below the threshold pressure and the disrupt period runs its course at block 207, control passes to block 208 where vehicle operation is again normalized.

It should be understood that the methods and apparatuses described above are only exemplary and do not limit the scope of the invention, and that various modifications could be made by those skilled in the art that would fall under the scope of the invention. For example, while the system is described above as including two separate pressure sensors 52 and 54, mechanical pressure differential sensors exist for generating a signal when one pressure drops below another. In addition, a differential value (see block 82 in FIG. 4) may be set by a spring within a mechanical pressure sensor so that the pressure sensor simply provides a signal to the processor 56 when the cab pressure drops below a threshold pressure. In this case, the threshold setting step 82 and comparison steps 84, 92 in FIG. 4 and other method FIGS. 5, 6 and 7 would not be performed by processor 56, rather processor 56 would simply respond to signals received from the sensor.

As another example, in the case of algorithms where an implement is disabled, enablement may not actually restart operation of the implement but rather, may enable restarting of the implement via affirmative selection of an implement enablement device (e.g., an input to interface 66).

As one other example, when an implement is disabled, where the tractor 10 is equipped with a mechanical marker (e.g., a foam indicator) or electronic marker (e.g., GPS) system, processor 56 may be programmed to automatically mark the location at which the implement was disabled so that operations can resume subsequently at the exact same location.

Moreover, while the invention is specifically described above in the context of a harvester (see FIG. 1), it should be understood that the invention is applicable in the case of other agricultural equipment such as self-propelled or tractor motivated agricultural sprayers or the like where controllable implements may include sprayer nozzles, booms, etc.

Furthermore, while the invention is described above in the context of a pressure sensing system, aspects of the invention are also applicable to other environment quality control systems. For instance, in addition to providing a cab pressure sensor in the cab, where a chemical filter (e.g., an absorber) is provided in the intake air stream plenum, a chemical sensor 41 (see FIG. 3) may be positioned within the cab 20 for sensing chemical presence within cab 20. Sensor 41 is linked to processor 56. When unexpected or undesirable chemicals are sensed within cab 20, processor 56 may perform any of the system altering processes described above. For instance in the case of a sprayer, processor 56 may disable the sprayer for a period to hinder system operation. Here, typically, the vehicle motive operation would not be completely disabled so that, if chemicals were sensed within the cab, the vehicle could still be moved into a "clean air" space away from the most recently sprayed area.

To apprise the public of the scope of this invention, the following claims are made:

1. An apparatus for protecting a vehicle operator within a cab of a mobile vehicle working in a polluted environment, the cab sealed from the polluted environment and including a pressure system for maintaining a cab pressure above a threshold pressure and a pressure sensor for generating an alarm signal when the cab pressure drops below the threshold pressure, the apparatus comprising:

a timer;

a processor linked to the timer and for, when a first alarm signal is generated, disrupting operation of the vehicle, timing out a disrupt period and, at the end of the disrupt period, returning the vehicle to normal operation; and a communication device for communicating information to a vehicle operator and a memory device for storing information related to possible causes of cab pressure reduction, the processor linked to the communication device and the memory device and, when an alarm signal is generated, retrieving the information and providing the information to the vehicle operator via the communication device, wherein, during the disrupt period, the processor monitors the alarm signal and, if the alarm signal ceases, returns the vehicle to normal operation.

2. The apparatus of claim 1 wherein the information also includes a message that vehicle operation will remain disrupted for the duration of one disrupt period unless the cab pressure rises above the threshold pressure.

3. The apparatus of claim 1 wherein the communication device is one of a visual display and an audio transmitter.

4. The apparatus of claim 1 wherein the information includes a list of instructions guiding the vehicle operator to perform various tasks to increase the cab pressure to a point above the threshold pressure.

5. The apparatus of claim 2 wherein the vehicle includes an implement and wherein the processor disrupts by disabling the implement.

6. The apparatus of claim 5 further including a marker system for marking field location and, wherein, the processor causes the marker system to mark location upon disabling the implement.

7. The apparatus of claim 1 further including an audible alarm and wherein the processor disrupts by activating the alarm.

8. The apparatus of claim 1 wherein the processor disrupts by reducing the maximum vehicle speed.

9. The apparatus of claim 1 wherein the vehicle includes an implement and wherein the processor disrupts by disabling the implement.

10. The apparatus of claim 1 further including a communication device for communicating information to a vehicle operator and a memory device for storing information related to possible causes of cab pressure reduction, the processor linked to the communication device and the memory device and, when an alarm signal is generated, the processor also retrieving the information and providing instructions based on the information to the vehicle operator via the communication device.

11. The apparatus of claim 10 wherein the communication device is one of an audible device and a visual device.

12. An apparatus for protecting a vehicle operator within a cab of a mobile vehicle working in a polluted environment, the cab sealed from the polluted environment and including a pressure system for maintaining a cab pressure above a threshold pressure and a pressure sensor for generating an alarm signal when the cab pressure drops below the threshold pressure, the apparatus comprising:

a communication device for communicating information to the vehicle operator;

a memory device for storing information related to possible causes of cab pressure reduction;

a processor linked to the communication device and the memory device and for, when an alarm signal is generated, retrieving the information and providing instructions based on the information to the vehicle operator via the communication device.

13. The method of claim 12 wherein the instructions guide the cab operator to perform various tasks to increase the cab pressure to a point above the threshold pressure.

14. A method for protecting a vehicle operator within a cab of a mobile vehicle working in a polluted environment, the cab sealed from the polluted environment and including a pressure system for maintaining a cab pressure above a threshold pressure and a pressure sensor for generating an alarm signal when the cab pressure drops below the threshold pressure, the method comprising the steps of:

monitoring the alarm signal;

providing a communication device for communicating information to a vehicle operator; and when an alarm signal is generated,
  starting a timer to time out a disrupt period;
  disrupting vehicle operation during the disrupt period;
  at the end of the disrupt period, normalizing vehicle operation; and
  providing information related to possible causes of cab pressure reduction to the vehicle operator via the communication device, wherein, during the disrupt period, the method further includes the steps of monitoring the alarm signal and, if the alarm signal ceases, normalizing vehicle operation.

15. The method of claim 14 wherein the step of providing a communication device includes providing one of a visual display and an audio transmitter.

16. The method of claim 14 wherein the vehicle includes an implement and wherein the step of disrupting includes disabling the implement.

17. The method of claim 16 wherein the vehicle further includes a marker system for marking field location and, wherein, the step of disabling further includes the step of causing the marker system to mark location upon disabling the implement.

18. The method of claim 14 wherein the step of disrupting includes activating an audible alarm.

19. An apparatus for protecting a vehicle operator within a cab of a mobile vehicle working in a polluted environment, the cab sealed from the polluted environment and including a pressure system for maintaining a cab pressure above a threshold pressure and a pressure sensor for generating an alarm signal when the cab pressure drops below the threshold pressure, the apparatus comprising:

a timer;

a processor linked to the timer and for, when a first alarm signal is generated, disrupting operation of the vehicle, timing out a disrupt period and, at the end of the disrupt period, returning the vehicle to normal operation; and an indicator wherein when the first alarm signal is generated, the processor activates the indicator and times out a delay period prior to disrupting vehicle operation, and the indicator includes a communication device for communicating information to a vehicle operator and a memory device for storing information related to possible causes of cab pressure reduction, the processor is linked to the communication device and the memory device and, when an alarm signal is generated, the processor activates the indicator by retrieving the information and providing instructions based on the information to the vehicle operator via the communication device during the delay period and during the disrupt period.

20. An apparatus for protecting a vehicle operator within a cab of a mobile vehicle working in a polluted environment, the cab sealed from the polluted environment and including a pressure system for maintaining a cab pressure above a threshold pressure and a pressure sensor for generating an alarm signal when the cab pressure drops below the Threshold pressure, the apparatus comprising:

a timer;

a processor linked to the timer and for, when a first alarm signal is generated, disrupting operation of the vehicle, timing out a disrupt period and, at the end of the disrupt period, returning the vehicle to normal operation; and a communication device for communicating information to a vehicle operator and a memory device for storing information related to possible causes of cab pressure reduction, the processor linked to the communication device and the memory device and, when an alarm signal is generated, the processor also retrieving the information and providing instructions based on the information to the vehicle operator via the communication device.

21. The apparatus of claim 20 wherein the communication device is one of an audible device and a visual device.

22. A method for protecting a vehicle operator within a cab of a mobile vehicle working in a polluted environment, the cab sealed from the polluted environment and including a pressure system for maintaining a cab pressure above a threshold pressure and a pressure sensor for generating an alarm signal when the cab pressure drops below the threshold pressure, the method comprising the steps of:

monitoring the alarm signal; and providing an indicator, and when an alarm signal is generated,
  starting a timer to time out a disrupt period;
  disrupting vehicle operation during the disrupt period;
  at the end of the disrupt period, normalizing vehicle operation; and
  activating the indicator and timing out a delay period prior to the step of disrupting, wherein the step of providing an indicator includes the step of providing a communication device for communicating information to a vehicle operator and, when an alarm signal is generated, the step of activating the indicator includes providing information related to possible causes of cab pressure reduction to the vehicle operator via the communication device.

23. A method for protecting a vehicle operator within a cab of a mobile vehicle working in a polluted environment, the cab sealed from the polluted environment and including a pressure system for maintaining a cab pressure above a threshold pressure and a pressure sensor for generating an alarm signal when the cab pressure drops below the threshold pressure, the method comprising the steps of:

monitoring the alarm signal; and when an alarm signal is generated,
  starting a timer to time out a disrupt period;
  disrupting vehicle operation during the disrupt period; and
  at the end of the disrupt period, normalizing vehicle operation, wherein the vehicle includes an implement and wherein the step of disrupting includes disabling the implement, wherein the vehicle further includes a marker system for marking field location and the step of disabling further includes the step of causing the marker system to mark location upon disabling the implement.

* * * * *